(12) United States Patent
Kim

(10) Patent No.: US 10,606,710 B2
(45) Date of Patent: Mar. 31, 2020

(54) CONTROLLER, MEMORY SYSTEM AND OPERATING METHOD THEREOF

(71) Applicant: SK hynix Inc., Gyeonggi-do (KR)

(72) Inventor: Se-Hyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 155 days.

(21) Appl. No.: 15/800,411

(22) Filed: Nov. 1, 2017

(65) Prior Publication Data
US 2018/0285213 A1 Oct. 4, 2018

(30) Foreign Application Priority Data

Mar. 29, 2017 (KR) .................. 10-2017-0040065

(51) Int. Cl.
G06F 11/00 (2006.01)
G06F 11/14 (2006.01)
G06F 1/30 (2006.01)
G06F 11/10 (2006.01)

(52) U.S. Cl.
CPC ............ G06F 11/1469 (2013.01); G06F 1/30 (2013.01); G06F 11/1048 (2013.01); G06F 11/1441 (2013.01); G06F 2201/805 (2013.01)

(58) Field of Classification Search
CPC .. G06F 11/0727; G06F 11/073; G06F 11/076; G06F 11/1048; G06F 11/1441; G06F 11/1469; G11C 11/5642; G11C 16/26
See application file for complete search history.

(56) References Cited

U.S. PATENT DOCUMENTS

| 2013/0179629 A1* | 7/2013 | Shim ................... G06F 12/0246 711/103 |
| 2015/0049554 A1* | 2/2015 | Yim .................... G11C 16/3418 365/185.18 |
| 2015/0135023 A1* | 5/2015 | Mekhanik .......... G11C 16/3427 714/704 |
| 2015/0135025 A1* | 5/2015 | Kim .................... G06F 12/0246 714/704 |
| 2016/0118132 A1* | 4/2016 | Prins ...................... G11C 16/26 714/704 |
| 2018/0102790 A1* | 4/2018 | Oh ......................... G11C 16/26 |

FOREIGN PATENT DOCUMENTS

| KR | 1020120005856 | 1/2012 |
| KR | 1020150142792 | 12/2015 |

* cited by examiner

Primary Examiner — Michael Maskulinski
(74) Attorney, Agent, or Firm — IP & T Group LLP

(57) ABSTRACT

An operating method of a controller, the operating method comprising: reading first data stored in a first read group selected among read groups of a memory device when a sudden power off (SPO) occurs and then power is on; identifying the number of error bit data in each of the first data; and performing a reclaim operation to each of the first data based on the number of error bit data in each of the first data.

17 Claims, 12 Drawing Sheets

CONTROLLER, MEMORY SYSTEM AND OPERATING METHOD THEREOF

CROSS-REFERENCE TO RELATED APPLICATIONS

The present application claims priority of Korean Patent Application No. 10-2017-0040065, filed on Mar. 29, 2017, which is incorporated herein by reference in its entirety.

BACKGROUND

1. Field

Exemplary embodiments of the present invention relate to a controller, a memory system including the same, and an operating method of the same.

2. Description of the Related Art

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a controller capable of preventing a decrease in the retention time of data which are stored in a memory device by performing a reclaim operation to the stored data at a proper time point. The controller is capable of preventing a decrease in the retention time of stored data even when a sudden power off (SPO) occurs repeatedly in a memory system which employs the memory device. Various embodiments are also directed to the memory system and an operating method thereof.

In an exemplary embodiment of the present invention, an operating method of a controller, the operating method comprising: reading first data stored in a first read group selected among read groups of a memory device when a sudden power off (SPO) occurs and then power is on; identifying the number of error bit data in each of the first data; and performing a reclaim operation to each of the first data based on the number of error bit data in each of the first data.

Preferably, each of the read groups may include a predetermined number of word lines.

Preferably, the first read group may be selected among the read groups based on an occurrence number of the SPO.

Preferably, the first read group may be selected among the read group according to a round robin scheme.

Preferably, the reclaim operation may be performed to second data having a smaller number of error bit data than a predetermined threshold among the first data.

Preferably, the predetermined threshold may be between one (1) and the number of correctable error bit data.

Preferably, the each of the read groups may include word lines of different memory dies in the memory device.

In an exemplary embodiment of the present invention, A controller comprising: an error correction code unit configured to identify the number of error bit data in each of first data; a processor configured to: read the first data stored in a first read group selected among read groups of a memory device when a sudden power off (SPO) occurs and then power is on; and perform a reclaim operation to each of the first data based on the number of error bit data in each of the first data.

Preferably, each of the read groups may include a predetermined number of word lines.

Preferably, the processor may be configured to select the first read group among the read groups based on an occurrence number of the SPO.

Preferably, wherein the processor may be configured to select the first read group among the read group according to a round robin scheme.

Preferably, the processor may be configured to perform the reclaim operation to second data having a smaller number of error bit data than a predetermined threshold among the first data.

Preferably, the predetermined threshold may be between one (1) and the number of correctable error bit data.

Preferably, each of the read groups may include word lines of different memory dies in the memory device.

In an exemplary embodiment of the present invention, A memory system comprising: a memory device suitable for storing data; and a controller suitable for controlling the memory device, wherein the controller configured to: read first data stored in a first read group selected among read groups of the memory device when a sudden power off (SPO) occurs and then power is on; identify the number of error bit data in each of the first data; and perform a reclaim operation to each of the first data based on the number of error bit data in each of the first data.

Preferably, each of the read groups may include a predetermined number of word lines.

Preferably, the controller is configured to select the first read group among the read groups based on an occurrence number of the SPO.

Preferably, the controller is configured to select the first read group among the read group according to a round robin scheme.

Preferably, the controller is configured to perform the reclaim operation to second data having a smaller number of error bit data than a predetermined threshold among the first data.

Preferably, the predetermined threshold may be between one (1) and the number of correctable error bit data.

In accordance with various embodiments of the present invention, a controller may prevent decrease in retention time of data stored in a memory device by performing reclaim operation to the data stored in the memory device at a proper time point even when a sudden power off (SPO) occurs repeatedly in a memory system.

BRIEF DESCRIPTION OF THE DRAWINGS

These and other features and advantages of the present invention will become apparent to those skilled in the art to which the present invention pertains from the following detailed description in reference to the accompanying drawings.

DETAILED DESCRIPTION

Figure 1:
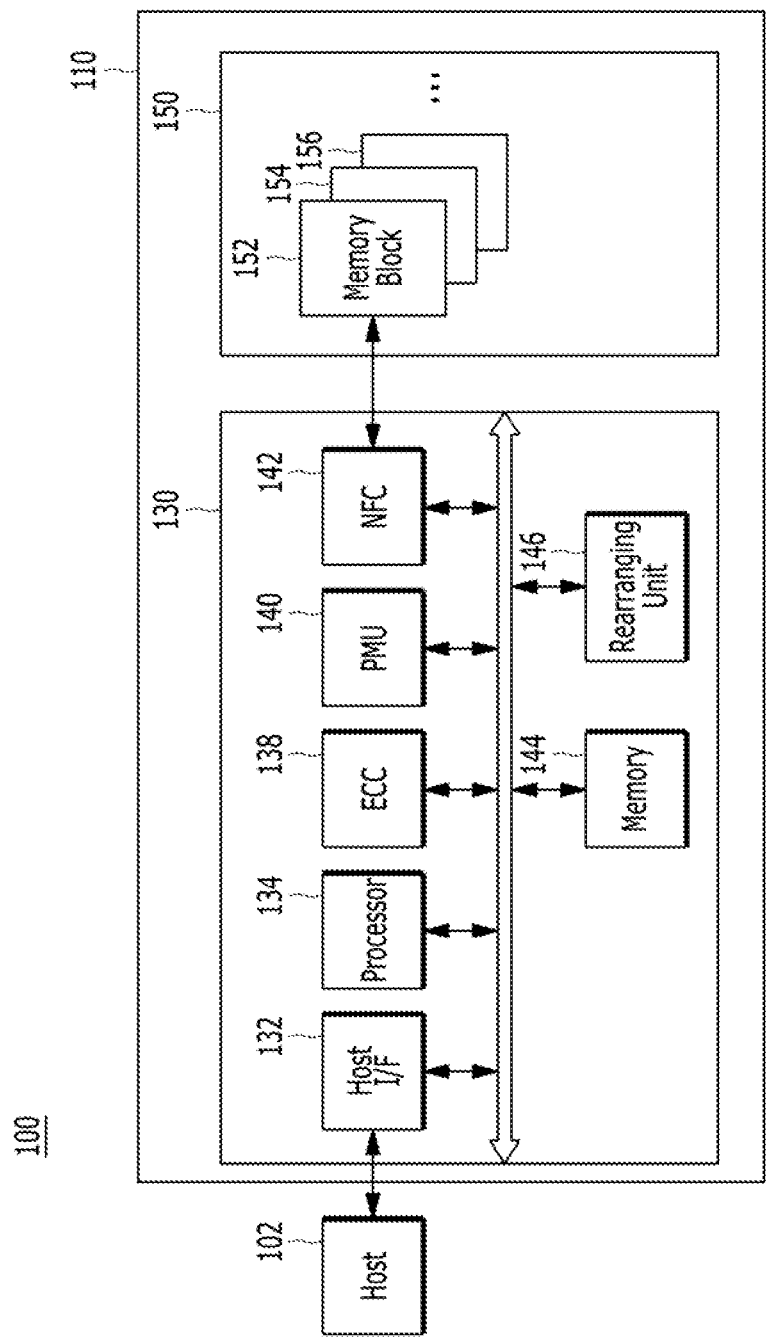
FIG. 1 is a block diagram illustrating a data processing system in accordance with an embodiment of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include portable electronic devices such as a mobile phone, MP3 player and laptop computer or non-portable electronic devices such as a desktop computer, game machine, TV and projector.

The memory system 110 may operate to store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 120, and the controller 130 may control data storage into the memory device 150.

The controller 130 and the memory device 150 may be integrated into a single semiconductor device, which may be included in the various types of memory systems as exemplified above.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory dies, each memory die including a plurality of planes, each plane including a plurality of memory blocks 152 to 156, each of the memory blocks 152 to 156 may include a plurality of pages, and each of the pages may include a plurality of memory cells coupled to a word line.

The controller 130 may control the memory device 150 in response to a request from the host 102. For example, the controller 130 may provide data read from the memory device 150 to the host 102, and store data provided from the host 102 into the memory device 150. For this operation the controller 130 may control read, write, program and erase operations of the memory device 150.

The controller 130 may include a host interface (I/F) unit 132, a processor 134, an error correction code (ECC) unit 138, a Power Management Unit (PMU) 140, a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130.

The NFC 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150.

The memory 144 may serve as a working memory of the memory system 110 and the controller 130 and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 1 exemplifies the memory 144 disposed within the controller 130. In an embodiment the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL).

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation needs to be performed with more reliability.

Figure 2:
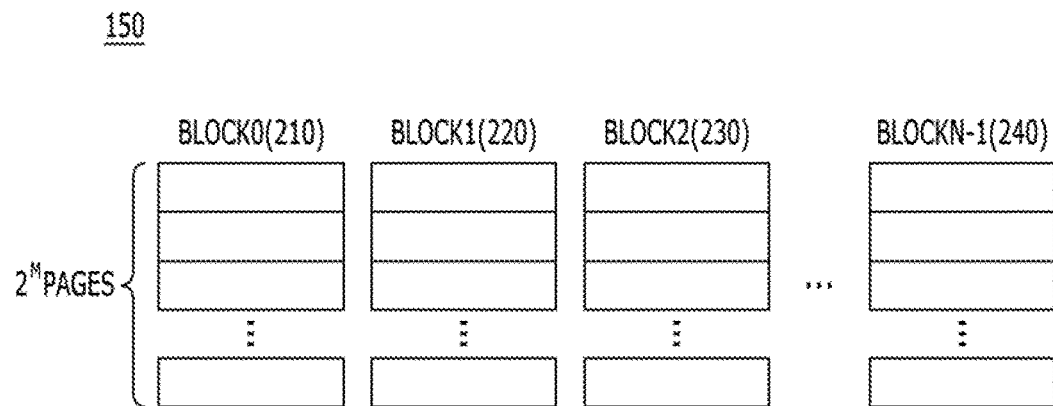
FIG. 2 is a schematic diagram illustrating an exemplary configuration of a memory device employed in the data processing system shown in FIG. 1.

FIG. 2 is a schematic diagram illustrating an exemplary configuration of the memory device 150.

Referring to FIG. 2, the memory device 150 may include a plurality of memory blocks BLOCK 0 to N−1 and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth.

Figure 3:
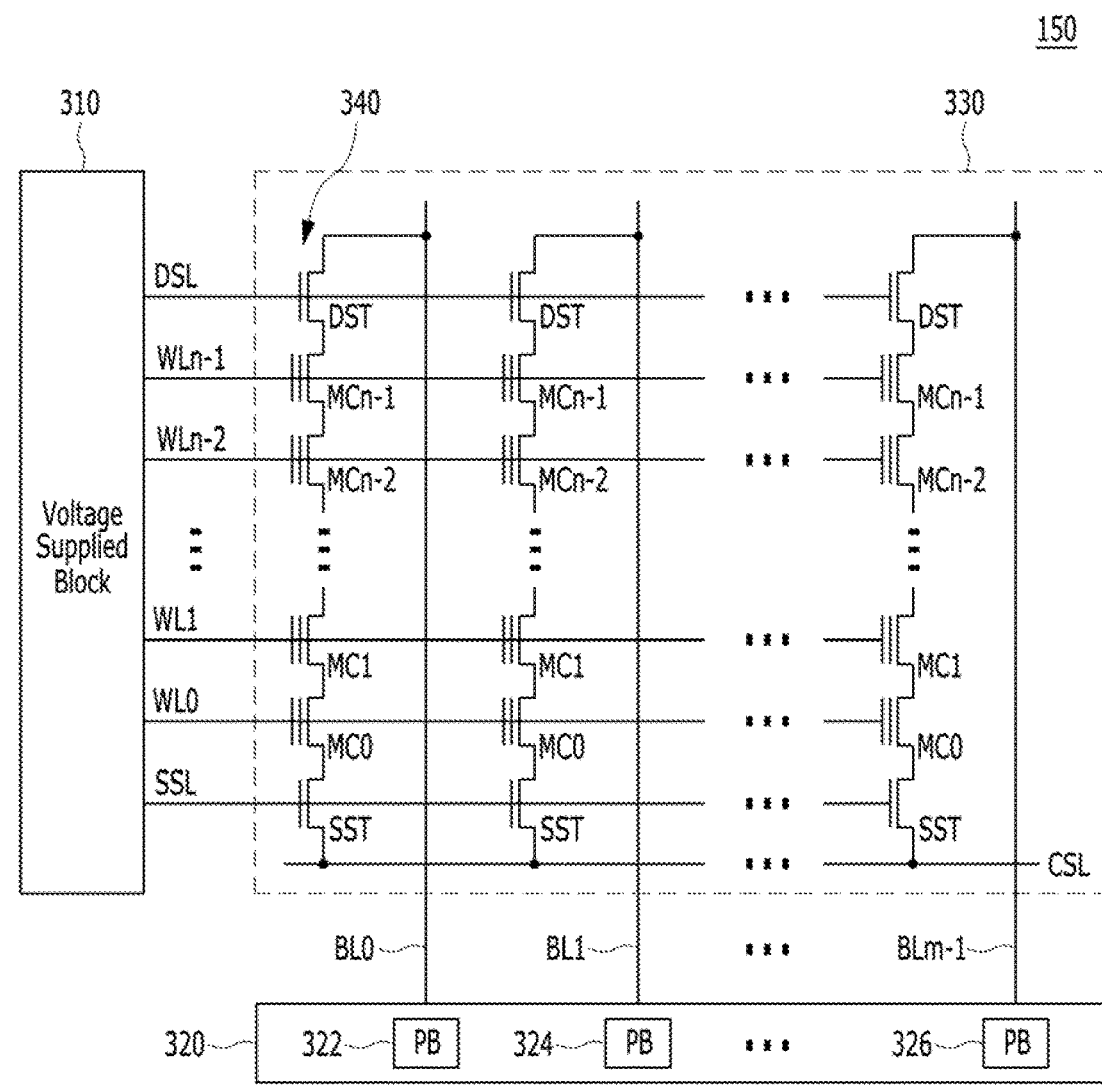
FIG. 3 is a circuit diagram illustrating an exemplary configuration of a memory cell array of the memory device shown in FIG. 1.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 of the memory system 110 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
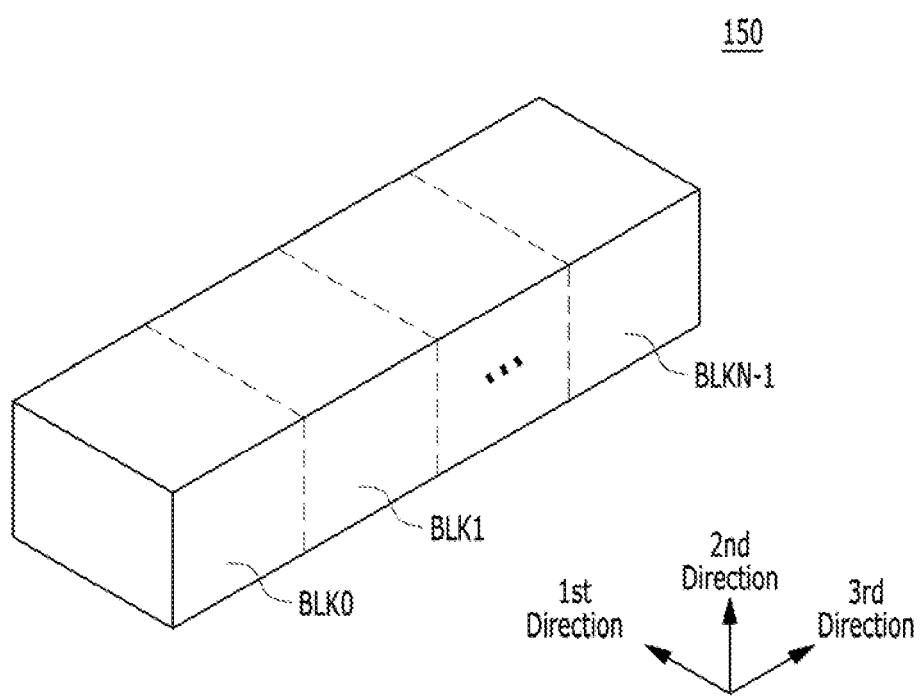
FIG. 4 is a schematic diagram illustrating an exemplary 3D structure of the memory device shown in FIG. 1.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereinafter, with reference to FIGS. 5 to 9 a method is described according to which the controller 130 can identify a condition of a partial region in the memory device 150 when the memory system 110 is powered on after a sudden power off (SPO) thereof.

Figure 5:
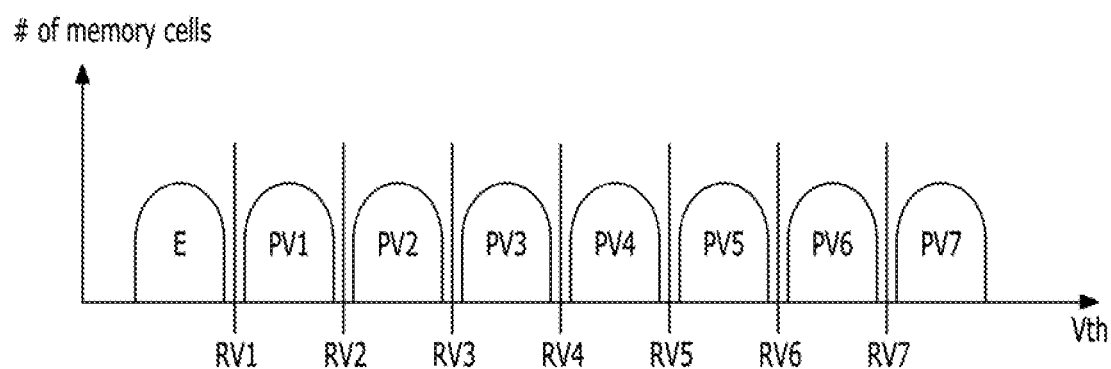
FIG. 5 is a diagram illustrating a threshold voltage distribution of programmed memory cells.

FIG. 5 is a diagram illustrating a threshold voltage distribution of programmed memory cells.

Figure 6:
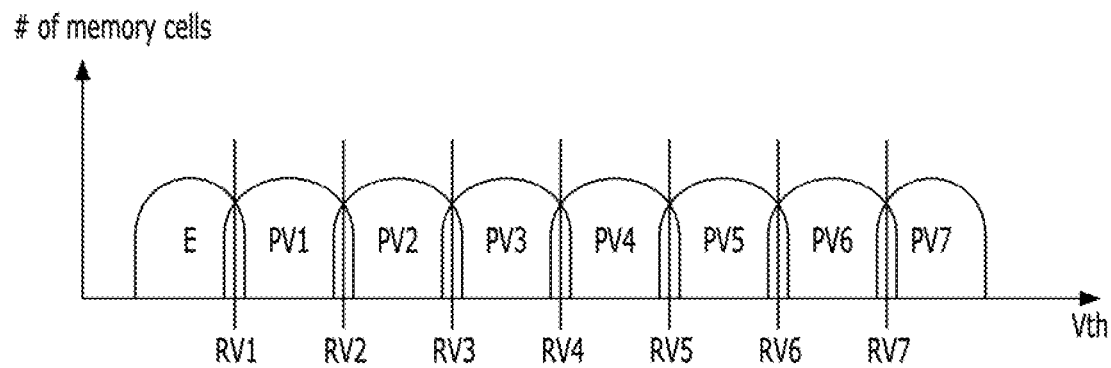
FIG. 6 is a diagram illustrating a threshold voltage distribution of programmed memory cells having reduced read voltage margins due to read voltage application to the programmed memory cells.

FIG. 6 is a diagram illustrating a threshold voltage distribution of programmed memory cells having reduced read voltage margins due to read voltage application to the programmed memory cells.

A memory cell may have a threshold voltage Vth, and may have one of an erase state and program states according to a level of the threshold voltage Vth.

The threshold voltage Vth of a SLC memory cell may be identified by a single read voltage (e.g., a first read voltage RV1), and may have one of an erase state E and a single program state PV1. The threshold voltage Vth of an MLC memory cell may be identified by three (3) read voltages (e.g., first to third read voltages RV1 to RV3), and may have one of an erase state E and three (3) program states PV1 to PV3. The threshold voltage Vth of a TLC memory cell may be identified by seven (7) read voltages (e.g., first to seventh read voltages RV1 to RV7), and may have one of an erase state E and seven (7) program states PV1 to PV7. It is assumed for illustration purposes that a memory cell is a TLC hereinafter.

Referring to FIG. 5, memory cells coupled to a word line, to which a program operation is completed, may have one of the erase state E and seven (7) program states PV1 to PV7.

As exemplified in FIG. 5, a memory cell having the threshold voltage Vth lower than the first read voltage RV1 may be evaluated to have the erase state E. A memory cell having the threshold voltage Vth between the first and second read voltages RV1 and RV2 may be evaluated to have the first program state PV1. A memory cell having the threshold voltage Vth between the second and third read voltages RV2 and RV3 may be evaluated to have the second program state PV2. In similar manner, a memory cell may be evaluated to have one of the third to seventh program states PV3 to PV3 by the third to seventh read voltages RV3 to RV7.

As exemplified in FIG. 5, the numbers of memory cells having the respective erase and program states E and PV1 to PV7 may be substantially the same as one another. In the case of completion of program operation to a word line, a number of memory cells having the erase state E may be substantially the same as a number of memory cells having the first program state PV1, and the number of memory cells having the first program state PV1 may be substantially the same as a number of memory cells having the second program state PV2. Similarly, the number of memory cells having the second program state PV2 may be substantially the same as a number of memory cells having any one of the third to seventh program states PV3 to PV7.

As exemplified in FIG. 5, the threshold voltages Vth of the program-completed memory cells may have a read voltage margin from the read voltages RV1 to RV7. For example, a memory cell having the erase state E may have a predetermined voltage level difference with respect to the first read voltage RV1. For example, a memory cell having the first program state PV1 may have predetermined voltage level differences with respect to the first and second read voltages RV1 and RV2, respectively. For example, a memory cell having one of the second to seventh program states PV2 to PV7 may have predetermined voltage level differences with respect to the second to seventh read voltages RV2 to RV7, respectively.

However, the threshold voltage Vth of a memory cell may change as a read voltage is applied to the memory cells. That is, the threshold voltage Vth of a memory cell may change as data are read from the memory cells.

As exemplified in FIG. 6, as the read voltages are applied to the memory cells, the threshold voltages Vth of memory cells having the erase and first to seventh program states E and PV1 to PV7 may be lower or higher than the first to seventh read voltages RV1 to RV7, respectively.

For example, the threshold voltage Vth of a memory cell having the erase state E may be higher than the first read voltage RV1. For example, the threshold voltage Vth of a memory cell having the first program state PV1 may be lower than the first read voltage RV1 or higher than the second read voltage RV2. For example, the threshold voltages Vth of memory cells having the second to seventh program states PV2 to PV7 may be lower than the second to sixth read voltages RV2 to RV6, respectively, or may be higher than the third to seventh read voltages RV3 to RV7, respectively.

As the threshold voltages Vth of memory cells change, the threshold voltage distributions of the memory cells having neighbouring states may overlap each other.

As illustrated in FIG. 6, the threshold voltage distributions of the memory cells having the erase state E and the first program state PV1 may overlap each other. The threshold voltage distributions of the memory cells having the first and second program states PV1 and PV2 may overlap each other. In similar manner, the threshold voltage distributions of the memory cells having the third to seventh program states PV3 to PV7 may overlap the threshold voltage distributions of the memory cells having neighbouring states (i.e., second to seventh program states PV2 to PV7), respectively.

When the threshold voltage distributions of the memory cells having different neighbouring states overlap, data read from the memory cells may have errors.

As exemplified in FIG. 6, when the fourth read voltage RV4 is applied to the memory cells, there may be errors in data read from the memory cells having the threshold voltage Vth higher than the fourth read voltage RV4 among the memory cells having the third program state PV3. In similar manner, when the fourth read voltage RV4 is applied to the memory cells, there may be errors in data read from the memory cells having the threshold voltage Vth lower than the fourth read voltage RV4 among the memory cells having the fourth program state PV4. There may be errors in data read from memory cells of overlapped threshold voltage distributions. As the threshold voltage distributions of the memory cells having different neighbouring states overlaps each other, data read from the memory cells may include error bits.

The present invention addresses this concern by providing the controller 130 which can perform a reclaim operation of copying data stored in memory cells of overlapped threshold voltage distributions into another memory cells. The controller 130 may perform a reclaim operation of copying data stored in memory cells into another memory cells based on a read count of a corresponding word line. The read count of a word line refers to the number of read voltage applications to the word line. The read count for each word line may be stored in the memory device 150.

An embodiment of the present invention also addresses problems arising when a sudden power off (SPO) occurs in the memory system 110 before completion of storing the read counts into the memory device 150 because the read count may not represent a substantial application number of the read voltage to each word line. For example, after the controller 130 controls the memory device 150 to read data stored in memory cells coupled to a first word line in response to a read command from the host 102, when a sudden power off (SPO) occurs in the memory system 110 before the controller 130 completes update of the read count of the first word line stored in the memory device 150, the read count of the first word line may have a smaller value by '1' than the actual application number of the read voltage to the first word line. As a result, as the read count is not updated due to the SPO in the memory system 110 for the first word line, a reclaim operation may not be performed for the first word line at a proper time point.

Hence, as an example, assuming a reclaim operation is set to be performed to the first word line when the read count of the first word line is greater than 1000, the controller 130 may not perform the reclaim operation to the first word line due to the SPO of the memory system 110 even when an actual application number of the read voltage to the first word line is greater than 1000.

Hence, as the reclaim operation is not performed to one or more word lines at a proper time point due to an SPO, there may be a number of un-correctable errors in the data read from memory cells coupled to the one or more word lines which are not subjected to a reclaim operation at a proper time due to a SPO. That is, as the reclaim operation is not performed to one or more word lines at a proper time point due, for example, an SPO, data stored in memory cells coupled to each word line may be damaged.

Hereinafter, described with reference to FIG. 7 will be a reclaim operation of the memory system 110 in accordance with an embodiment of the present invention.

Figure 7:
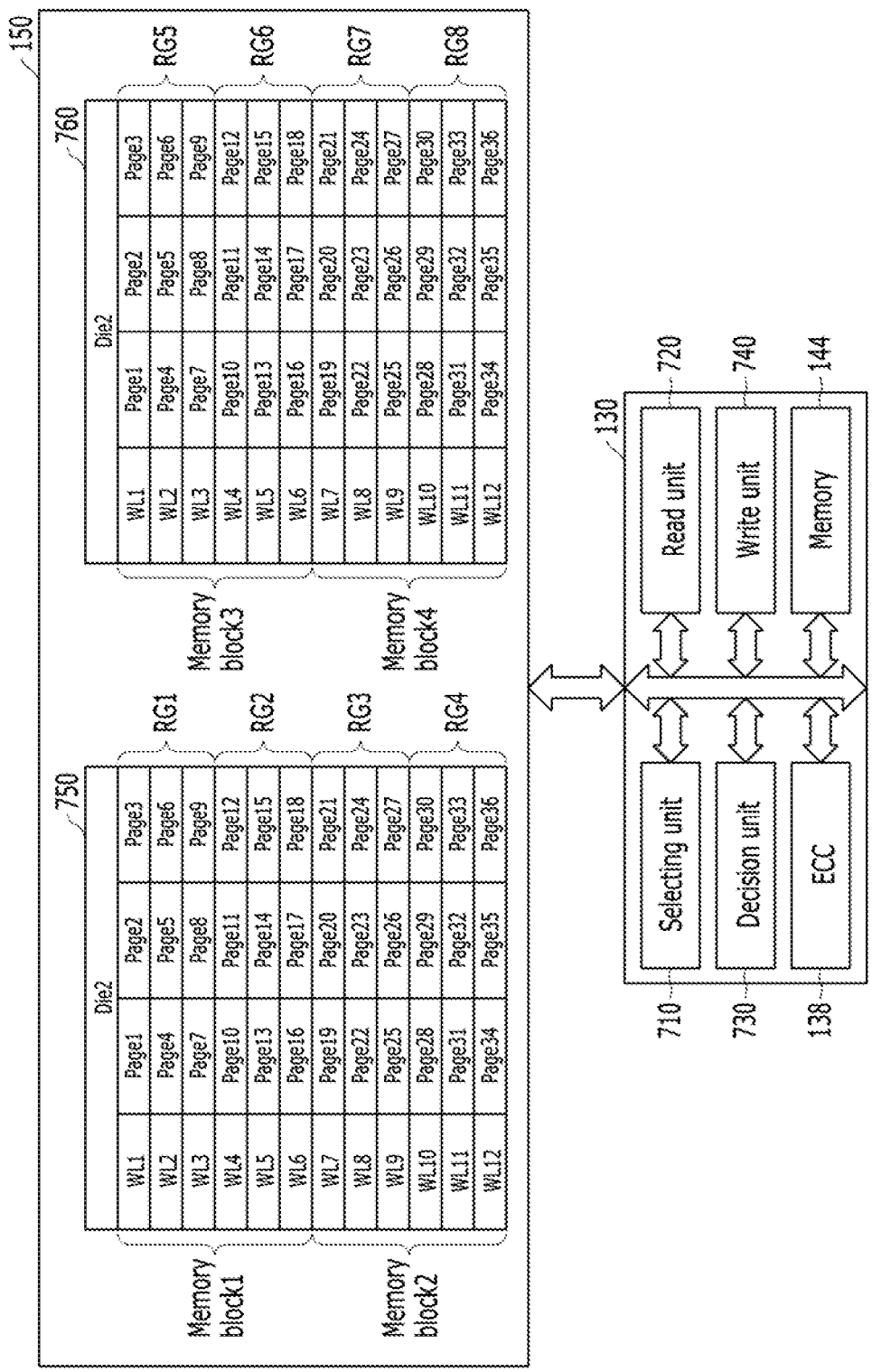
FIG. 7 is a schematic diagram illustrating the memory system shown in FIG. 1.

FIG. 7 is a schematic diagram illustrating the memory system 110.

Referring to FIG. 7, the controller 130 may further include a selecting unit 710, a read unit 720, a decision unit 730 and a write unit 740.

The memory device 150 may include a plurality of memory dies 750 and 760 each having a plurality of memory blocks. As exemplified in FIG. 7, the first memory die 750 may include first and second memory blocks, and the second memory die 760 may include third and fourth memory blocks. The respective first to fourth memory blocks may each include a plurality of word lines. As exemplified in FIG. 7, the first memory block may include first to sixth word lines WL1 to WL6, the second memory block may include seventh to twelfth word lines WL7 to WL12, the third memory block may include six word lines WL13 to WL24, and fourth memory block may include six word lines WL25 to WL36.

Each of the word lines WL1 to WL36 may include a plurality of pages. As exemplified in FIG. 7, when memory cells are TLC memory cells, the respective word lines WL1 to WL36 may include three (3) pages, which is merely an example. The memory cells may be SLC, MLC, QLC or a combination thereof.

The selecting unit 710 may select one of a plurality of predetermined read groups RG1 to RG8 when the memory system 110 is powered on after an SPO. The read group is a group of word lines, to which a read operation is performed when the memory system 110 is powered on after the SPO. The respective read groups RG1 to RG8 may include one or more word lines. As exemplified in FIG. 7, each of the read groups RG1 to RG8 includes three (3) word lines, and the selecting unit 710 may select one of the read groups RG1 to RG8.

The selecting unit 710 may select one of the read groups RG1 to RG8 corresponding to a read group index. Specifically, the selecting unit 710 may select one of the read groups RG1 to RG8 corresponding to one of the read group indexes 1 to $N_G$. The number "$N_G$" may represent the number of the read groups RG1 to RG8. The read group indexes 1 to $N_G$ may be generated according to a random function, a round robin scheme or an SPO count.

For example, when the read group indexes 1 to $N_G$ is generated according to the SPO count, the selecting unit 710 may select one of the read groups RG1 to RG8 corresponding to one of the read group indexes 1 to $N_G$ generated by equation 1.

$$I_G = C_{SPO} \bmod N_G \quad \text{[Equation 1]}$$

In equation 1, $I_G$ may be the read group index, $C_{SPO}$ may be the SPO count, and $N_G$ may be the number of the read groups. Referring to equation 1, the read group index $I_G$ is the remainder of the division result of the SPO count $C_{SPO}$ by the number of read groups $N_G$. Therefore, if the SPO occurs as many times as the number of read groups $N_G$, it may represent that each of the read groups may be selected at least one time.

As exemplified in FIG. 7, when the word lines may be grouped by eight (i.e., $N_G$ is 8) in the memory device 150 and the SPO occurs three times (i.e., $C_{SPO}$ is 3), the selecting unit 710 may select the third read group RG3, which correspond to the read group index $I_G$ having a value 3 (i.e., 3 mod 8). Also, as exemplified in FIG. 7, when the word fines may be grouped by eight (i.e., $N_G$ is 8) in the memory device 150 and the SPO occurs twelve times (i.e., $C_{SPO}$ is 12), the selecting unit 710 may select the fourth read group RG4, which correspond to the read group index $I_G$ having a value 4 (i.e., 12 mod 8).

Further, for example, when selecting one of the read groups RG1 to RG8 based on the SPO count. $C_{SPO}$, the selecting unit 710 may select one of the read groups RG1 to RG8 by using the read group index $I_G$, which is generated according to a predetermined function with the SPO count $C_{SPO}$ as an input. The predetermined function may be a hash function. For example, as exemplified in FIG. 7, when the word lines may be grouped by eight (i.e., $N_G$ is 8) in the memory device 150 and the SPO occurs three times (i.e., $C_{SPO}$ is 3), the selecting unit 710 may select one of the read groups RG1 to RG8 corresponding to the read group index $I_G$, which is generated according to the hash function with 3 as an input value.

The read unit 720 may read data stored in pages of the read group selected by the selecting unit 710. For example, when the selecting unit 710 selects the third read group RG3, the read unit 720 may read data from pages (i.e., Page19 to Page27) included in the third read group RG3. The data read by the read unit 720 may be stored in the memory 144.

The ECC unit 138 may detect and correct errors of data stored in the memory 144.

The decision unit 730 may decide whether to perform a reclaim operation. Specifically, the decision unit 730 may decide whether to perform a reclaim operation based on a number of errors detected by the ECC unit 138. For example, when a number of the detected errors is smaller than a predetermined threshold, the decision unit 730 may decide to perform a reclaim operation. The predetermined threshold may be greater than one (1) and smaller than a maximum number of correctable errors. For example, when an error correction code of the ECC unit 138 can correct five (5) errors at maximum, the predetermined threshold may be determined between one (1) and five (5).

For example, when errors of a smaller number than the predetermined threshold are detected in data read from $21^{st}$ and $25^{th}$ pages among pages (i.e. Page19 to Page25) included in the selected third read group RG3 and stored in the memory 144, the decision unit 730 may decide to perform a reclaim operation to data read from the $21^{st}$ and $25^{th}$ pages and stored in the memory 144. Accordingly, the data read from the $21^{st}$ and $25^{th}$ pages and stored in the memory 144 may be written into another page.

The write unit 740 may write data, to which the decision unit 730 decides to perform a reclaim operation, into another page. For example, when the decision unit 730 decides to perform a reclaim operation to the data read from the $21^{th}$ and $25^{th}$ pages and stored in the memory 144, the write unit 740 may write the data read from the $21^{st}$ and $25^{th}$ pages and stored in the memory 144 into another page.

Figure 8:
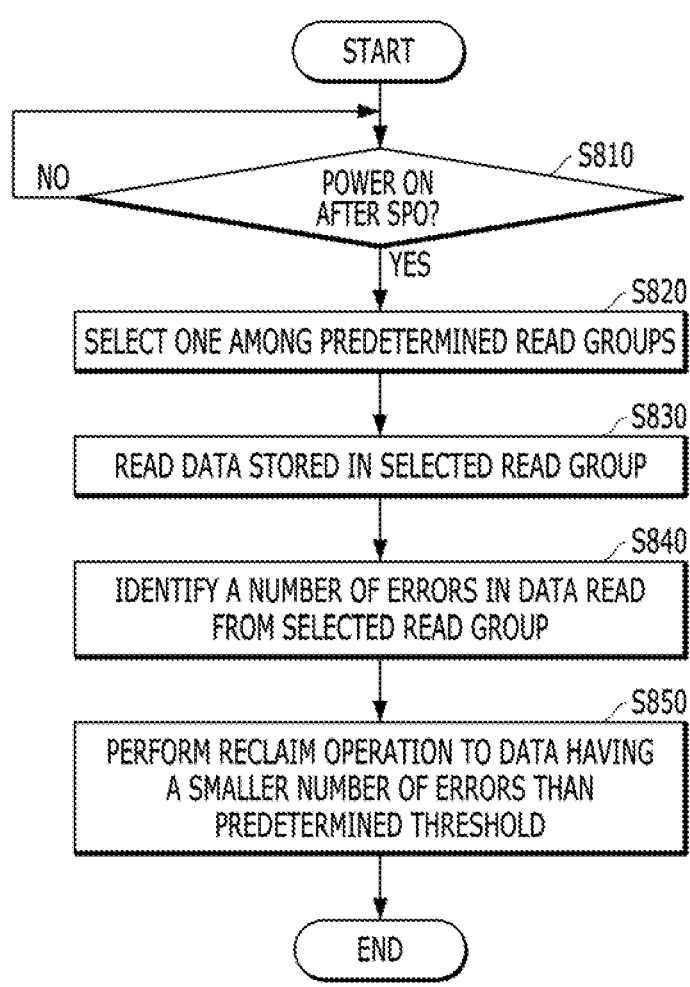
FIG. 8 is a flowchart of memory system operation in accordance with an embodiment of the present invention.

FIG. 8 is a flowchart illustrating an operation of the memory system 110 in accordance with an embodiment of the present invention.

Referring to FIG. 8, at step S810, the controller 130 may determine whether an SPO has occurred in the memory system 110 and then the memory system 110 has been powered on.

When an SPO has occurred in the memory system 110 and then the memory system 110 has been powered on ("YES" at step S810), the controller 130 may perform step S820. When the SPO has not occurred in the memory system 110 or the memory system 110 has not been powered on ("NO" at step S810), the controller 130 may repeat step S810.

At step S820, the selecting unit 710 may select one of the predetermined read groups (e.g., the read groups RG1 to RG8).

At step S830, the read unit 720 may read data from the read group selected at step S820.

At step S840 the ECC unit 138 may identify a number of errors of data read by the read unit 720 and stored in the memory 144.

At step S850, the write unit 740 may perform a reclaim operation to data having errors, a number of which is smaller than the predetermined threshold.

As described above, in accordance with an embodiment of the present invention, the memory system 110 may perform a reclaim operation without a read command provided from the host 102 by selecting one of the predetermined read groups whenever the SPO occurs therein and it is powered on, and by deciding whether to perform the reclaim operation. Accordingly, a reclaim operation may be performed at a proper time point even when a SPO occurs repeatedly in the memory system 110.

Figure 9:
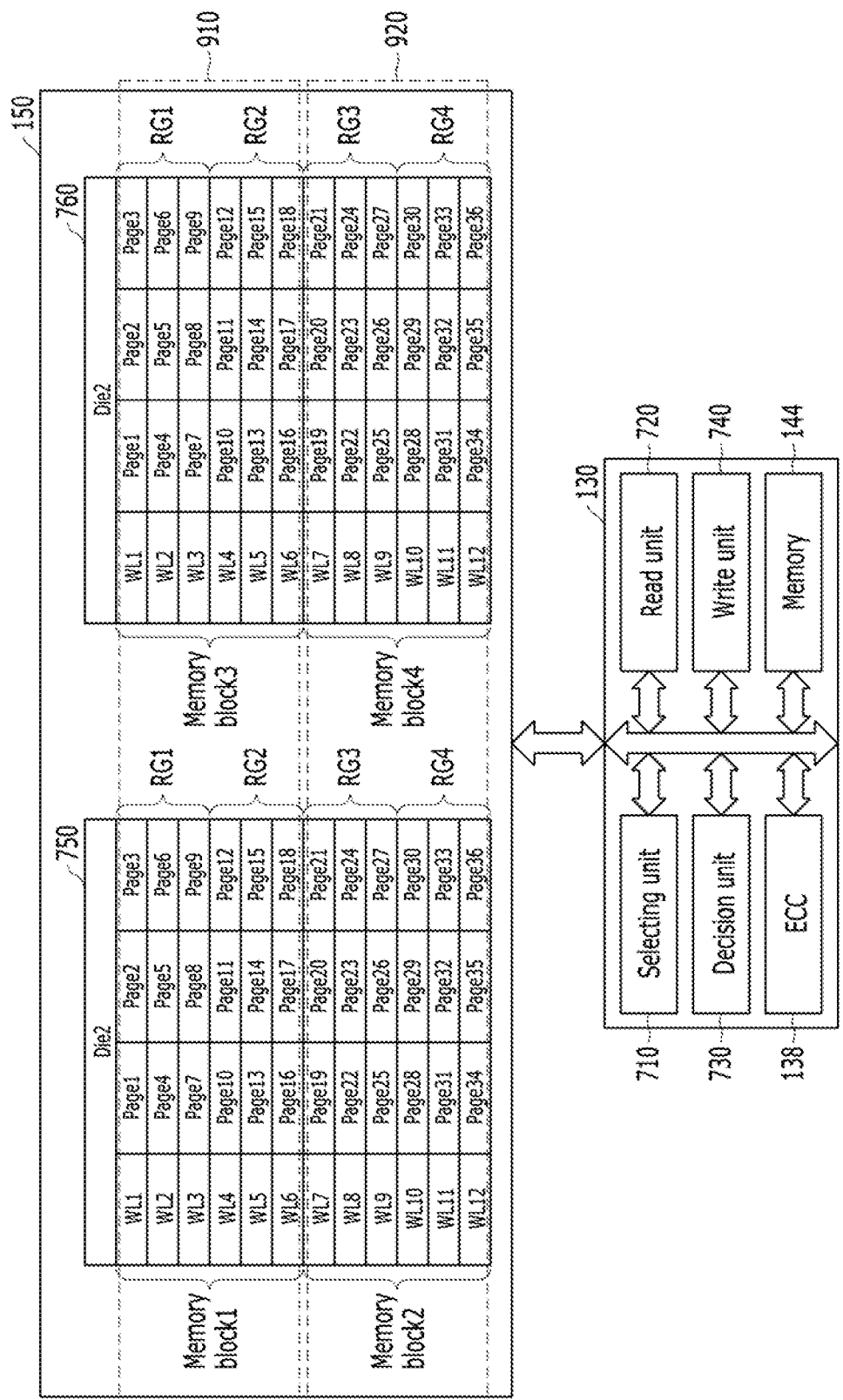
FIG. 9 is a schematic diagram illustrating the memory system shown in FIG. 1.

FIG. 9 is a schematic diagram illustrating the memory system 110.

When compared with the embodiment of FIG. 7, the embodiment of FIG. 9 may manage the memory blocks according to a super memory block scheme.

Referring to FIG. 9, the controller 130 may manage super memory blocks, each of which includes a plurality of memory blocks of the memory device 150. The memory blocks included in the respective super memory blocks may be controlled at a time by the controller 130. As exemplified in FIG. 9, the controller 130 may manage super memory blocks 910 and 920, each of which includes one or more memory blocks in each of memory dies Die1 and Die2 of the memory device 150. FIG. 9 exemplifies a first super memory block 910 including first and third memory blocks Memory block 1 and Memory block 3 and a second super memory block 920 including second and fourth memory blocks Memory block 2 and Memory block 4.

The controller 130 may control the memory blocks in each of the super memory blocks 910 and 920 at a time through an interleaving scheme such as a channel interleaving scheme, a memory die interleaving scheme, a memory chip interleaving scheme, and a way interleaving scheme.

Accordingly, when the controller 130 manages the memory blocks as the super memory blocks, each read group may have greater number of word lines than those in the embodiment of FIG. 7. For example, referring to FIG. 9, since the controller 130 may control the first and second dies Die1 and Die2 of the first super memory block 910 at a time through the interleaving scheme, a first read group may include first to third word lines WL1 to WL3 of the first memory die Die1 and first to third word lines WL1 to WL3 of the second memory die Die2.

Hereinafter, described with reference to FIGS. 10 to 18 will be a data processing system and an electronic apparatus in accordance with an embodiment of the present invention. The data processing system and electronic apparatus may include the memory system 110 described above with reference to FIGS. 1 to 9.

FIGS. 10 to 18 are schematic diagrams illustrating various embodiments of a data processing system including the memory system 110.

Figure 10:
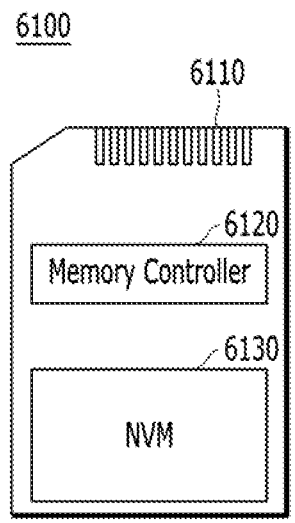
FIGS. 10 to 18 are schematic diagrams illustrating various embodiments of a data processing system including the memory system shown in FIGS. 1 to 9.

FIG. 10 is a diagram schematically illustrating an embodiment of the data processing system including the memory system 110. FIG. 10 schematically illustrates a memory card system 6100 to which the memory system 110 is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIGS. 1 to 9, and the memory device 6130 may correspond to the memory device 150 of the memory system 110 described with reference to FIGS. 1 to 9.

Thus, the memory controller 6120 may include a RAM, a processing unit, a host interface, a memory interface and an error correction unit. The memory controller 130 may further include the elements shown in FIG. 5.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) a spin torque transfer and magnetic RAM (STT-RAM).

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
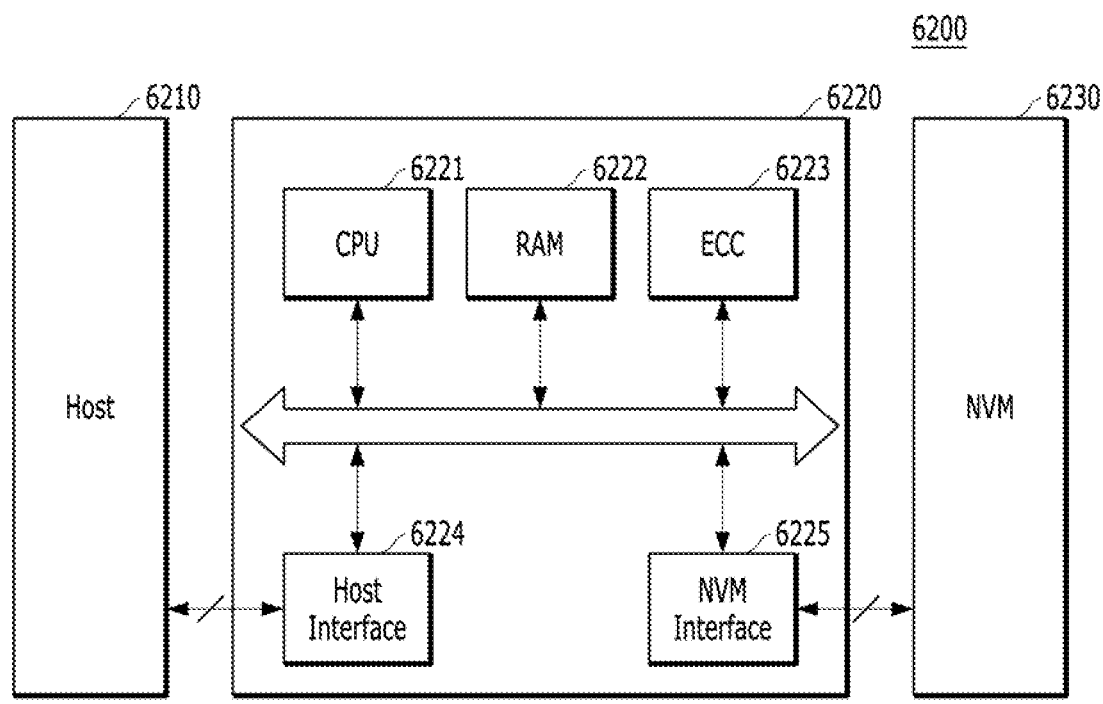

FIG. 11 is a diagram schematically illustrating another embodiment of the data processing system 6200 including the memory system 110.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIGS. 1 to 9, and the memory controller 6220 may correspond to the controller 130 in the memory system 110 illustrated in FIGS. 1 to 9.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
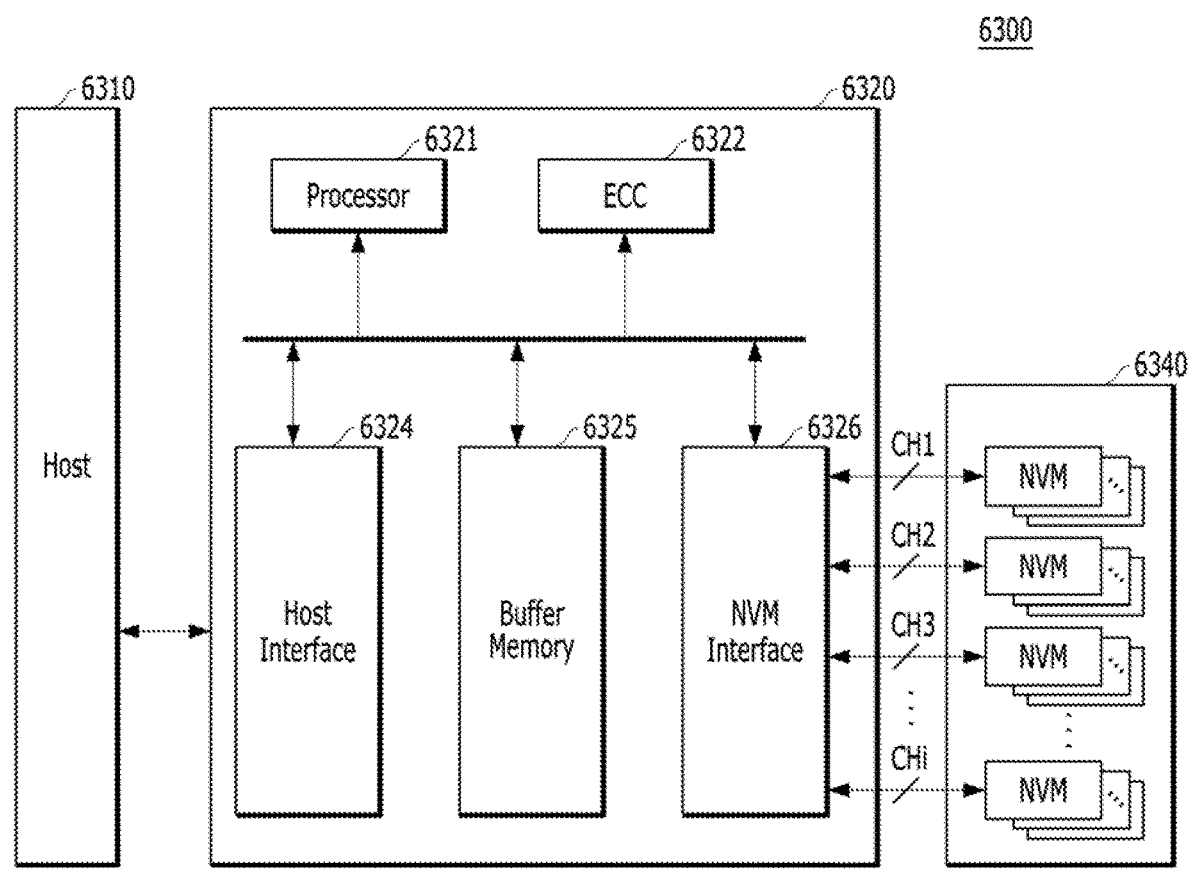

FIG. 12 is a diagram schematically illustrating another embodiment of the data processing system including the memory system 110. FIG. 12 schematically illustrates an SSD 6300 to which the memory system 110 is applied.

Referring to FIG. 12, the SSD 6300 may include a controller 6320 and a memory device 6340 including a plurality of nonvolatile memories. The controller 6320 may correspond to the controller 130 in the memory system 110 of FIGS. 1 to 9, and the memory device 6340 may correspond to the memory device 150 in the memory system of FIGS. 1 to 9.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 12 illustrates that the buffer memory 6325 is provided in the controller 6320. However, the buffer memory 6325 may be provided outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIGS. 1 to 9 is applied may be provided to embody a data processing system, for example, Redundant Array of Independent Disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
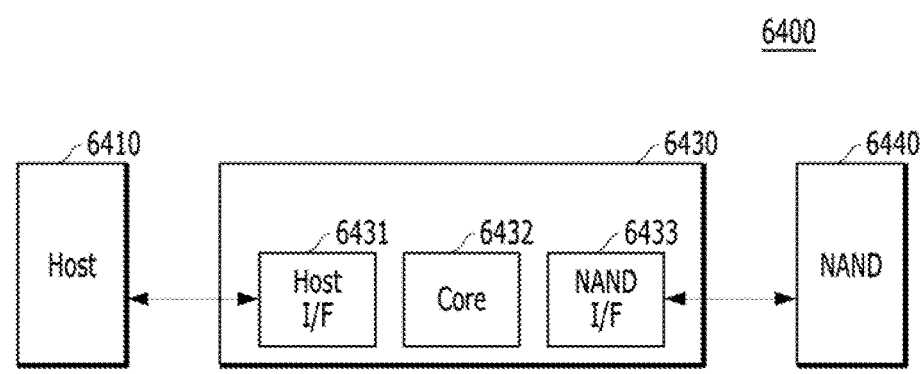

FIG. 13 is a diagram schematically illustrating another embodiment of the data processing system including the memory system 110. FIG. 13 schematically illustrates an embedded Multi-Media Card (eMMC) 6400 to which the memory system 110 is applied.

Referring to FIG. 13 the eMMC 6400 may include a controller 6430 and a memory device 6440 embodied by one or more NAND flash memories. The controller 6430 may correspond to the controller 130 in the memory system 110 of FIGS. 1 to 9, and the memory device 6440 may correspond to the memory device 150 in the memory system 110 of FIGS. 1 to 9.

More specifically, the controller 6430 may be connected to the memory device 6440 through a plurality of channels. The controller 6430 may include one or more cores 6432, a host interface 6431 and a memory interface for example, a NAND interface 643.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS-I/UHS-II) interface.

FIGS. 14 to 17 are diagrams schematically illustrating other embodiments of the data processing system including the memory system 110. FIGS. 14 to 17 schematically illustrate Universal Flash Storage (UFS) systems to which the memory system 110 is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830 respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIGS. 1 and 5. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, Mobile Industry Processor Interface (MIPI) M-PHY and MIPI Unified Protocol (Uni-Pro) in MIPI. Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
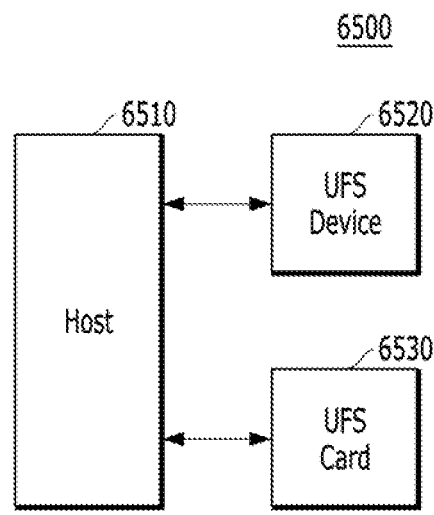

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
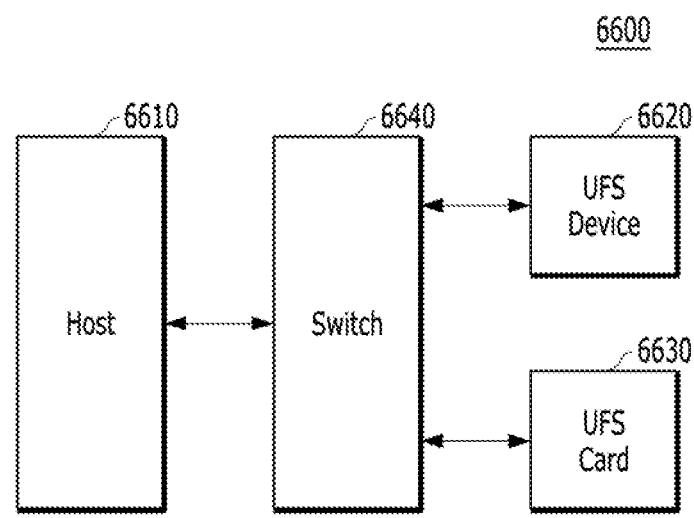

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
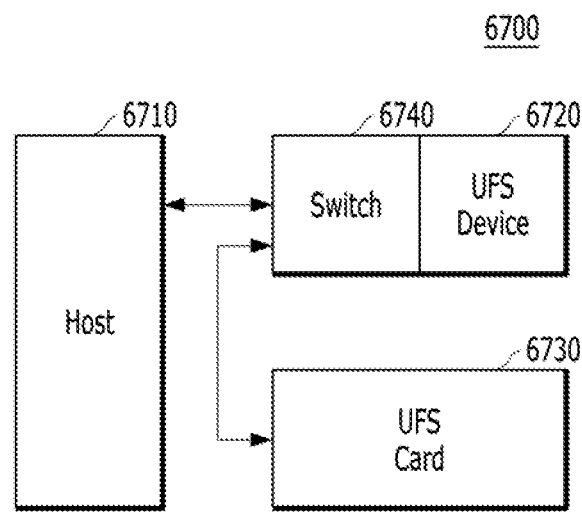

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
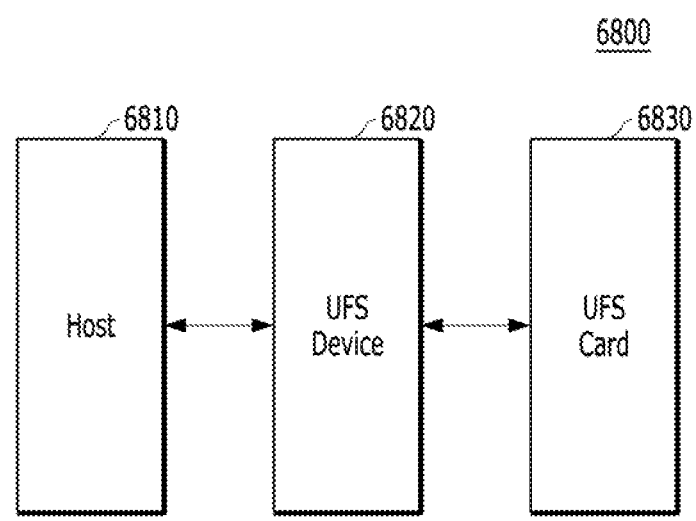

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
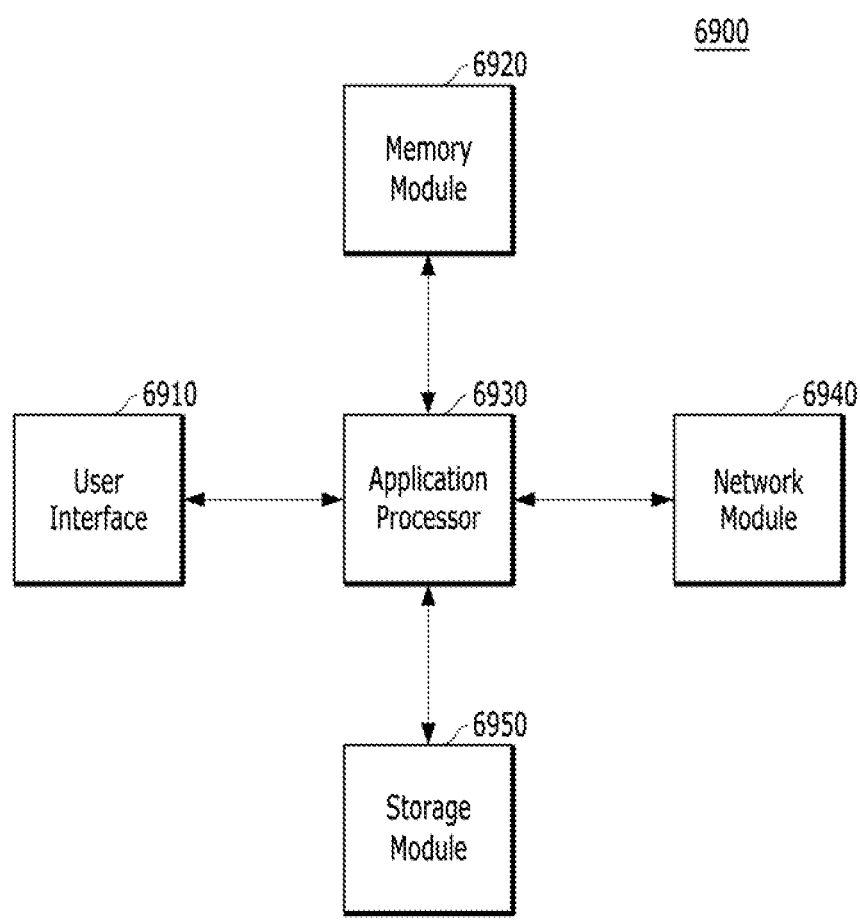

FIG. 18 is a diagram illustrating another embodiment of the data processing system including the memory system 110. FIG. 18 schematically illustrates a user system 6900 to which the memory system according to the embodiment is applied.

Referring to FIG. 18, the user system 6900 may include an application processor 6930, a memory module 6920, a network module 6940, a storage module 6950, and a user interface 6910.

The application processor 6930 may drive components included in the user system 6900 and an operating system (OS). For example, the application processor 6930 may include controllers for controlling the components included in the user system 6900, interfaces, graphics engines, and so on. The application processor 6930 may be provided by a system-on-chip (SoC).

The memory module 6920 may operate as a main memory, a working memory, a buffer memory or a cache memory of the user system 6900. The memory module 6920 may include a volatile random access memory such as a dynamic random access memory (DRAM), a synchronous dynamic random access memory (SDRAM), a double data rate (DDR) SDRAM, a DDR2 SDRAM, a DDR3 SDRAM a low power double data rate (LPDDR) SDRAM an LPDDR2 SDRAM and an LPDDR3 SDRAM or a nonvolatile random access memory such as a phase change random access memory (PRAM) a resistive random access memory (ReRAM), a magnetic random access memory (MRAM) and a ferroelectric random access memory (FRAM). For example, the application processor 6930 and the memory module 6920 may be mounted by being packaged on the basis of a package-on-package (POP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances. For example, a mobile electronic appliance. According to this fact, the memory system and the data processing system according to the embodiment may be applied to wired/wireless electronic appliances. The network module 6940 may be included in the application processor 6930.

The storage module 6950 may store data such as data received from the application processor 6530, and transmit data stored therein, to the application processor 6530. The storage module 6950 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6950 may be provided as a removable storage medium such as a memory card of the user system 6900 and an external drive. For example the storage module 6950 may correspond to the memory system 110 described above with reference to FIG. 1, and may be implemented with the SSD, eMMC and UFS described above with reference to FIGS. 12 to 17.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED) a speaker and a motor.

In the case where the memory system 110 described above with reference to FIG. 1 is applied to the mobile electronic appliance of the user system 6900 according to an embodiment, the application processor 6930 may control the operations of the mobile electronic appliance, and the network module 6940 as a communication module may control wired/wireless communication with an external device, as described above. The user interface 6910 as the display/touch module of the mobile electronic appliance displays data processed by the application processor 6930 or supports input of data from a touch panel.

While the present invention has been described with respect to the specific embodiments, it will be apparent to those skilled in the art that various changes and modifications may be made without departing from the spirit and scope of the invention as defined in the following claims.

What is claimed is:

1. An operating method of a controller, the operating method comprising:
   reading first data stored in a first read group selected among read groups of a memory device when a sudden power off (SPO) occurs and then power is on;
   determining the number of error bit data in each of the first data; and
   performing a reclaim operation to each of the first data based on the number of error bit data in each of the first data,
   wherein the first read group is selected among the read group according to a round robin scheme.

2. The operating method of claim 1, wherein each of the read groups includes a predetermined number of word lines, and
   wherein the first read group is selected among the read groups based on an occurrence number of the SPO.

3. The operating method of claim 1, wherein the reclaim operation is performed to second data having a smaller number of error bit data than a predetermined threshold among the first data.

4. The operating method of claim 3, wherein the predetermined threshold is between one (1) and the number of correctable error bit data.

5. The operating method of claim 1, wherein each of the read groups includes word lines of different memory dies in the memory device.

6. An operating method of a controller, the method comprising:
   reading first data stored in a first read group selected among read groups of a memory device when a sudden power off (SPO) occurs and then power is on;
   identifying the number of error bit data in each of the first data; and
   performing a reclaim operation to each of the first data based on the number of error bit data in each of the first data,
   wherein each of the read groups includes a predetermined number of word lines, and
   wherein the first read group is selected among the read groups based on an occurrence number of the SPO.

7. A controller comprising:
   an error correction code unit configured to determine the number of error bit data in each of first data;
   a processor configured to:
   read the first data stored in a first read group selected among read groups of a memory device when a sudden power off (SPO) occurs and then power is on; and
   perform a reclaim operation to each of the first data based on the number of error bit data in each of the first data,
   wherein the processor is configured to select the first read group among the read group according to a round robin scheme.

8. The controller of claim 7, wherein each of the read groups includes a predetermined number of word lines.

9. The controller of claim 8, wherein the processor is configured to select the first read group among the read groups based on an occurrence number of the SPO.

10. The controller of claim 7, wherein the processor is configured to perform the reclaim operation to second data having a smaller number of error bit data than a predetermined threshold among the first data.

11. The controller of claim 10, wherein the predetermined threshold is between one (1) and the number of correctable error bit data.

12. The controller of claim 7, wherein each of the read groups includes word lines of different memory dies in the memory device.

13. A memory system comprising:
a memory device suitable for storing data; and
a controller suitable for controlling the memory device, wherein the controller configured to:
read first data stored in a first read group selected among read groups of the memory device when a sudden power off (SPO) occurs and then power is on;
determine the number of error bit data in each of the first data; and
perform a reclaim operation to each of the first data based on the number of error bit data in each of the first data,
wherein the controller is configured to select the first read group among the read group according to a round robin scheme.

14. The memory system of claim 13, wherein each of the read groups includes a predetermined number of word lines.

15. The memory system of claim 14, wherein the controller is configured to select the first read group among the read groups based on an occurrence number of the SPO.

16. The memory system of claim 13, wherein the controller is configured to perform the reclaim operation to second data having a smaller number of error bit data than a predetermined threshold among the first data.

17. The memory system of claim 16, wherein the predetermined threshold is between one (1) and the number of correctable error bit data.

* * * * *